US 9,390,037 B2
Jul. 12, 2016

(12) United States Patent
Roy

(10) Patent No.: US 9,390,037 B2
(45) Date of Patent: Jul. 12, 2016

(54) PAD DIRECT MEMORY ACCESS INTERFACE

(71) Applicant: Silicon Laboratories Inc., Austin, TX (US)

(72) Inventor: Subrata Roy, Austin, TX (US)

(73) Assignee: SILICON LABORATORIES INC., Austin, TX (US)

(*) Notice: Subject to any disclaimer, the term of this patent is extended or adjusted under 35 U.S.C. 154(b) by 36 days.

(21) Appl. No.: 14/169,503

(22) Filed: Jan. 31, 2014

(65) Prior Publication Data

US 2015/0220466 A1    Aug. 6, 2015

(51) Int. Cl.
*G06F 13/28* (2006.01)
*G06F 13/38* (2006.01)
*G06F 13/364* (2006.01)

(52) U.S. Cl.
CPC .............. *G06F 13/28* (2013.01); *G06F 13/364* (2013.01)

(58) Field of Classification Search
None
See application file for complete search history.

(56) References Cited

U.S. PATENT DOCUMENTS

| | | | | |
|---|---|---|---|---|
| 5,896,549 A * | 4/1999 | Hansen | ................... | G06F 13/28 710/22 |
| 6,122,680 A * | 9/2000 | Holm et al. | ...................... | 710/52 |
| 2008/0114582 A1 * | 5/2008 | Leterrier et al. | ................. | 703/28 |
| 2009/0313399 A1 * | 12/2009 | Lingam et al. | ................... | 710/26 |

* cited by examiner

*Primary Examiner* — Idriss N Alrobaye
*Assistant Examiner* — Dayton Lewis-Taylor
(74) *Attorney, Agent, or Firm* — Trop, Pruner & Hu, P.C.

(57) ABSTRACT

A method includes assigning a plurality of pads of an integrated circuit (IC) to a direct memory access (DMA) channel of the IC; and storing DMA requests associated with the pads in a queue such that at a given time, the queue stores data indicative of DMA requests that are associated with more than one pad.

18 Claims, 8 Drawing Sheets

PAD DIRECT MEMORY ACCESS INTERFACE

BACKGROUND

An electrical system (an integrated circuit, a computer system or a microcontroller, as examples) may contain both digital and analog subsystems. The digital subsystem may contain, as examples, a clock generator, bus interfaces (a Universal Serial Bus (USB) interface and a serial peripheral interface (SPI) interface, as examples), a serial communication interface (a universal asynchronous receiver/transmitter (UART) interface, for example), programmable timers, and so forth. The analog subsystem may include such components as an analog-to-digital converter (ADC), current drivers, voltage level translators and so forth.

SUMMARY

In an example embodiment, a method includes assigning a plurality of pads of an integrated circuit (IC) to a direct memory access (DMA) channel of the IC; and storing DMA requests associated with the pads in a queue such that at a given time, the queue stores data indicative of DMA requests that are associated with more than one pad.

In another example embodiment, an apparatus includes signal pads; a set of analog circuitry associated with each of the signal pads; at least one register; and at least one queue. The set of analog circuitry includes at least one of an analog-to-digital converter, a digital-to-analog converter and a comparator. The register(s) assign at least one group of the signal pads to a direct memory access (DMA) channel, and the queue(s) are associated with the DMA channel to simultaneously store data indicative of DMA requests that associated with more than one pad.

In yet another example embodiment, an apparatus includes an integrated circuit (IC), which includes a plurality of pads and a direct memory access (DMA) interface. The DMA interface is adapted to store data indicative of DMA requests associated with the pads in a queue of the DMA interface such that a given time the queue stores data indicative of DMA requests associated with more than one pad.

Advantages and other desired features will become apparent from the following drawings, description and claims.

DETAILED DESCRIPTION

An integrated circuit (IC) may interact with a relatively large number of analog components that are external to the IC. In this manner, the analog components may be distributed around the periphery of the IC and may be electrically coupled to pads of the IC. The "pads" of the IC refer to metal regions of the IC, which are external accessible for purposes of forming electrical connections (connections via bond wires, solder bumps, and the like) with the IC.

Figure 1:
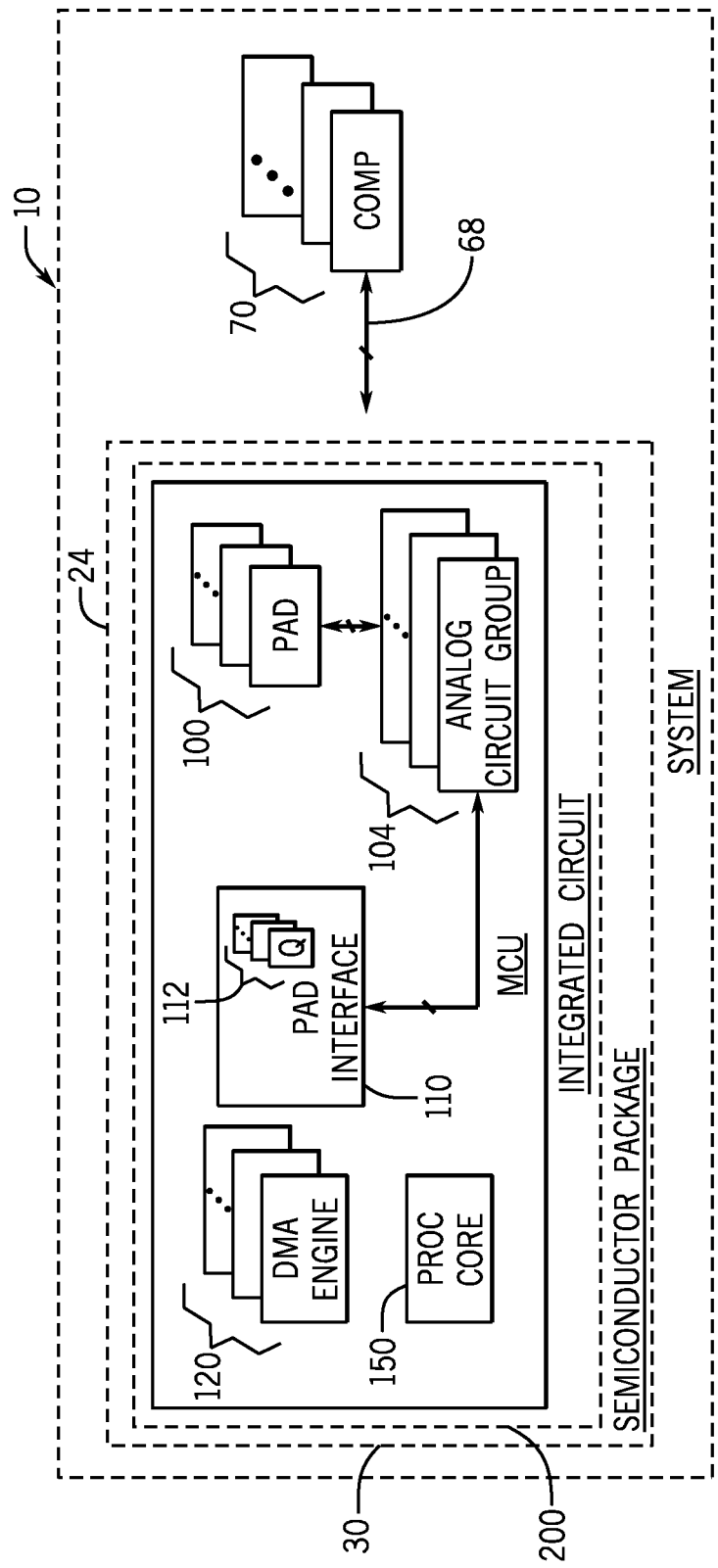
FIG. 1 is a schematic diagram of a microcontroller unit (MCU)-based system according to an example embodiment.

As a more specific example, FIG. 1 depicts a system 10, which includes a microcontroller unit (MCU) 24. As depicted in FIG. 1, the MCU 24 may be part of an IC 200 and may be packaged in a semiconductor package 30. In general, several components 70 may be electrically coupled (via communication power lines 68) to the MCU 24 for purposes of communicating analog and digital data with the MCU 24. For at least some of this communication, the MCU 24 includes analog circuit groups 104 that are associated with pads 100 of the MCU 24.

The analog circuit group 104 represents a set of analog circuits of the MCU 24, which may be available for a given pad 100. Thus, one or more pads 100 of the MCU 24 are associated with different analog circuit group(s) 104, in accordance with example embodiments. Moreover, the MCU 24 may be configured or programmed to assign a given analog circuit of a given analog circuit group 104 to the pad 100 that is associated with the group 104.

As a more specific example, a given analog circuit group 104 may contain an analog-to-digital converter (ADC), a digital-to-analog converter (DAC) and a comparator; and the MCU 24 may be programmed so that the ADC, DAC or comparator is assigned to the associated pad 100. In further embodiments, a given analog circuit group 104 may include other and/or different analog circuits, such as a current driver, a voltage level translator/shifter and so forth. In accordance with example embodiments, there may be a one-to-one correspondence between the analog circuit groups 104 and subset of pads 100 of the MCU 24.

The components 70 may access the analog circuitry of the MCU 24 for such purposes as providing one or more analog signals to the MCU 24, which ADC(s) of the MCU 24 converts into digital data; receiving one or more analog signals that are produced by DAC(s) of the MCU 24; and providing one or more analog signals to the MCU 24, which comparator(s) of the MCU 24 compares for purposes of triggering certain events.

Thus, in accordance with example embodiments, a given pad 100 may be programmed to accommodate a specified analog-related function. In this regard, the MCU 24 may be programmed so that a given pad 100 is associated with analog-to-digital conversion; digital-to-analog conversion; or a comparison function.

These analog functions may process/generate a relatively large amount of data. Moreover, this large amount of data may result in a relatively large amount of data transfers between the analog circuit groups 104 and an internal system memory of the MCU 24. For this purpose, the MCU 24 includes a pad interface 110 and direct memory access (DMA) engines 120.

In general, the pad interface 110 serves as a data transfer point for the analog circuit groups 104: ADC data is communicated from ADC(s) of the groups 104 to the pad interface 110 and from the pad interface 110 via DMA transfer(s) to the MCU's system memory; DAC data is communicated via DMA transfer(s) from the MCU's system memory to the pad interface 110 and from the pad interface 110 to the analog circuit groups 104; comparison result data is communicated from comparator(s) of the groups 104 to the pad interface 110 and from the pad interface 110 to the MCU system through signals that may trigger events, such as interrupts, reset or simply a status change to be monitored by MCU software.

In accordance with example embodiments, a given DMA engine 120 handles data transfers between the system memory of the MCU 24 and the pad interface 110 for purposes of offloading the overhead associated with such transfers from the MCU's processing core 150, which may otherwise handle the transfers. As described herein, the pad interface 110 permits the programmable assignment of DMA channels for purposes of servicing the pads 100. i.e., for purposes of communicating data to and from the MCU's system memory and the pad interface 110. More specifically, in accordance with example embodiments, a single DMA channel may be assigned to multiple pads 100 (and thus, may also be assigned to multiple, associated analog circuit groups 104). In general, the assignment of the pads 100 to the DMA channels is flexible in nature, as the pads 100 may be programmably partitioned among the available DMA channels.

In accordance with example embodiments, the pad interface 110 includes queues 112, and each queue 112 is associated with a particular DMA channel and stores DMA channel requests for the associated DMA channel. In general, a DMA channel request is generated, for example, when an analog-to-digital conversion has completed (e.g., data is to be transported from the pad interface 110 to the MCU's memory) or when data for a digital-to-analog conversion is updated (e.g., a register containing data for digital-to-analog data conversion has been updated). Because DMA requests for multiple pads 100 may occur simultaneously or near simultaneously, a queue 112 is maintained per DMA channel, in accordance with some embodiments. In accordance with example embodiments, each entry in the queue 112 contains data identifying the source of the request. In general, a new DMA request is generated for every valid entry in the queue 112.

In accordance with example embodiments, the pad interface 110 contains a DMA data register (called a "data port register" herein) to provide and receive data for the DMA transfers. In accordance with further example embodiments, the bus architecture of the MCU 24 permits multiple DMA channels to be active simultaneously. There are multiple request entries per DMA channel, in accordance with some embodiments. In general, the data associated with the requests remains with a pad controller 454 (discussed further herein in connection with FIG. 6), and as the requests are processed, data from different pad controllers 454 are routed to the data port register, as further described herein.

Figure 3:
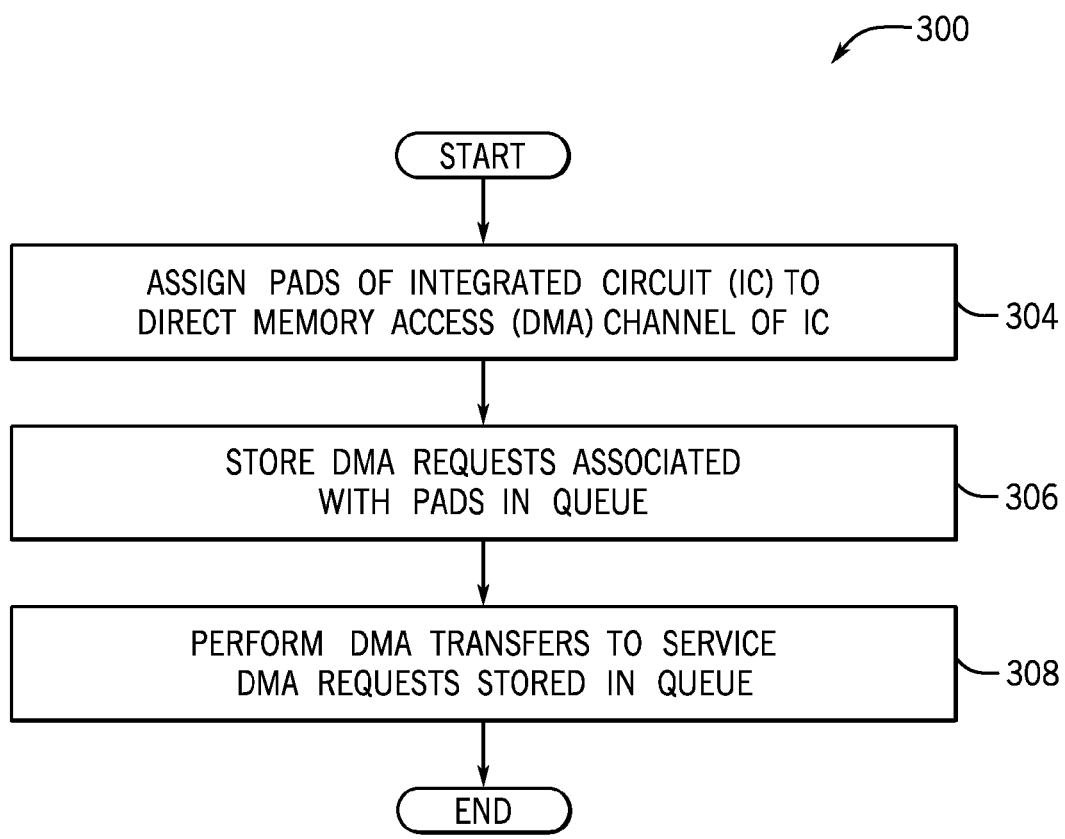
FIG. 3 is a flow diagram depicting a technique to process direct memory access (DMA) channel requests for communicating data to and from associated pads of an integrated circuit (IC) according to an example embodiment.

Referring to FIG. 3, thus, in general, in accordance with example embodiments, a technique 300 includes assigning (block 304) pads of an integrated circuit (IC) to a direct memory access (DMA) channel of the IC. DMA channel requests that are associated with the assigned pads are stored in in the queue, pursuant to block 306. DMA transfers may then be performed, pursuant to block 308, to service the requests that are stored in the queue.

Figure 2:
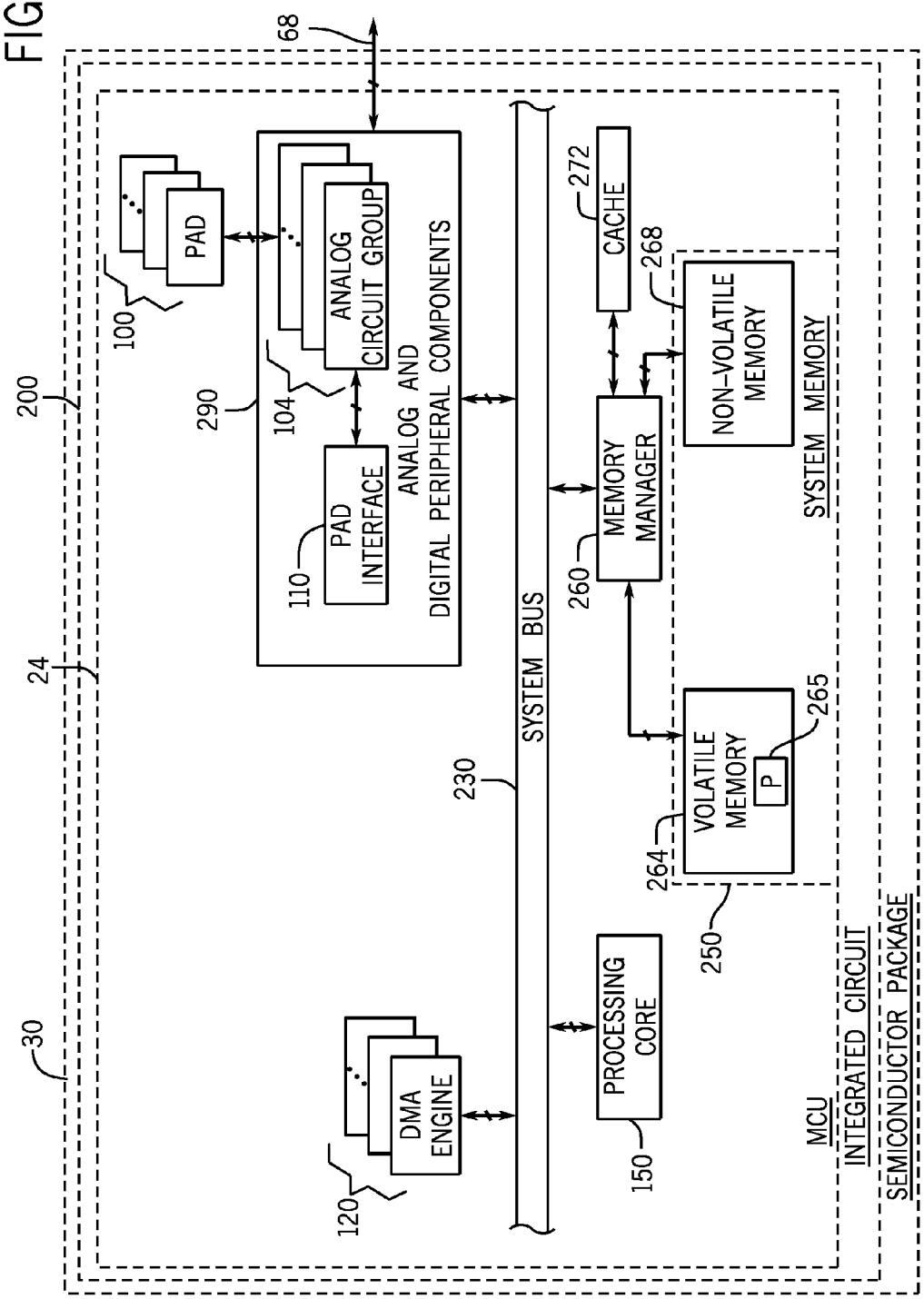
FIG. 2 is a schematic diagram of an MCU according to an example embodiment.

Referring to FIG. 2, as noted above, in accordance with some embodiments, all or part of the components of the MCU 24 may be part of an integrated circuit, such as IC 200. As examples, all or part of the components of the MCU 24 may be fabricated on a single die or on multiple dies. The IC 200 may be packaged to form a semiconductor package 30.

Among its components, the MCU 24 includes the processing core 150, the DMA engines 120 and various analog and digital peripheral components 290. The analog and digital peripheral components include the pad interface 110 and the analog circuit groups 104.

As an example, the processing core 150 may be a 32-bit core, such as the Advanced RISC Machine (ARM) processing core, which executes a Reduced Instruction Set Computer (RISC) instruction set. In general, the processing core 150 communicates with various other system components of the MCU 24, such as a memory controller, or manager 260, over a system bus 230. In general, the memory manager 260 controls access to various memory components of the MCU 24, such as a cache 272, a non-volatile memory 268 (a Flash memory, for example) and a volatile memory 264 (a static random access memory (SRAM), for example). As depicted in FIG. 2, the volatile memory 264 and the non-volatile memory 268 may form a system memory 250 of the MCU 24. In other words, the volatile memory 264 and the non-volatile memory 268 have memory locations that are part of the system memory address space for the MCU 24.

The processing core 150 may be a core other than an ARM-based processing core, in accordance with further example embodiments.

It is noted that FIG. 2 depicts a simplified representation of the MCU architecture, as the MCU 24 may have many other components, bridges, buses, and so forth, in accordance with further embodiments, which are not depicted in FIG. 2. For example, in accordance with some embodiments, the MCU 24 may have a bus matrix module that implements slave side arbitration and is used to regulate access to the memory devices of the MCU 24.

The components 290 include such analog components as the ADCs, DACs and comparators of the analog circuit groups 104. The components 290 may contain other analog components, such as current drivers, level translators, and so forth.

The digital components of the MCU 24 may communicate with the processing core 150 over the system bus 230. As examples, the digital components of the MCU 24 may include a Universal Serial Bus (USB) interface, a UART interface, a system management bus interface (SMB) interface, an SPI interface, and so forth.

Figure 4:
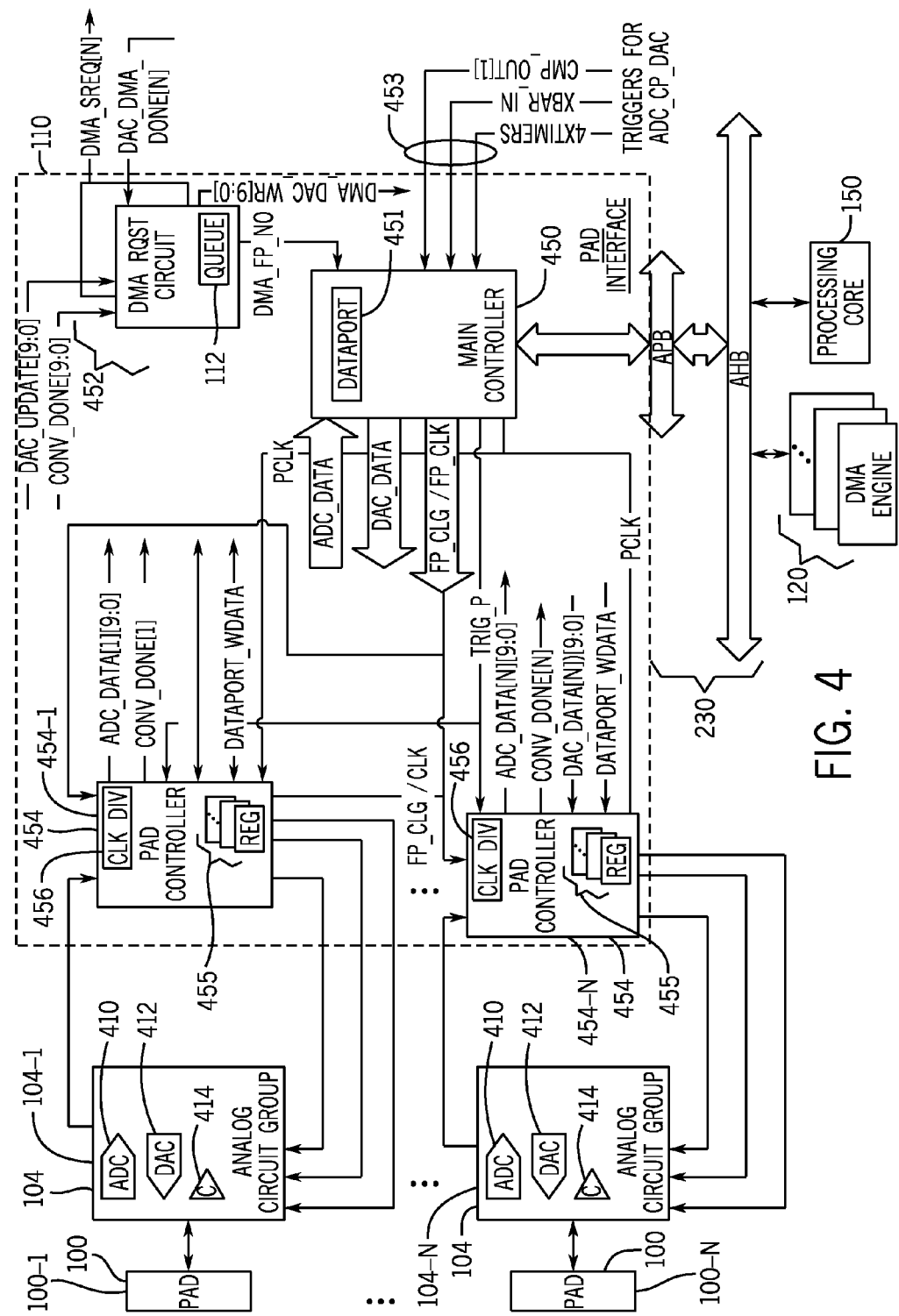
FIG. 4 is a schematic diagram of a pad interface of the MCU according to an example embodiment.

Referring to FIG. 4, in accordance with example embodiments, the MCU 24 includes N pads 100 (example pads 100-1, . . . , 100-N, being depicted in FIG. 4 as examples), and each of the pads 100 is associated with a particular analog circuit group 104 (N example analog circuit groups 104-1 . . . 104-N being depicted, as examples). For these example embodiments, the pad interface 110 further includes N pad controllers 454 (pad controllers 454-1, . . . , 454-N, being depicted in FIG. 4 as examples), and each pad controller 454 is associated with one of the pads 100. The pad controller 454 may contain multiple registers 455, such as a register to store DAC data for a DAC (of the group 104) of the associated pad 100; and a register to store ADC data produced from the analog signal received at the pad 100. As depicted in FIG. 4, each pad controller 454 may also include a clock divider 456, which is clocked by a clock signal (FP_CLK) that is synchronized to a system bus clock for purposes of generating the appropriate clock signals to control the communication of data to and from the pad controller 454.

The pad interface 110 also includes a main controller 450, which contains a data port register 451, which is accessible by the DMA engines 120 for purposes of communicating data between the system memory and the pad interface 110. The main controller 450 controls the multiplexing of the data port register 451 among the pad controllers 454 for purposes of transferring data to and from the register 451 and the pad controllers 454.

The pad interface 110 further includes DMA request circuits 452; and each request circuit 452 includes one of the DMA channel request queues 112. A given DMA request circuit 452 is associated with a particular DMA channel, and the queue 112 for the circuit 452 stores the DMA channel requests for the pads 100 that have been assigned to the associated DMA channel.

As depicted in FIG. 4, a given analog circuit group 104 may include an ADC 410, a DAC 412 and a comparator 414. The particular analog circuit that is assigned to the associated pad 100 (e.g., either the ADC 410, DAC 412 or comparator 414, as examples) may be programmed via a register 455. The analog circuit group 104 may provide a CMP_OUT signal, which may be asserted for purposes of indicating assertion of the comparator's output to the associated pad controller 454. For DAC functions, the analog circuit group 104 receives a DAC_UPDATE[ ] signal, which the associated pad controller 454 asserts to indicate that a multibit DAC data signal (DAC_DATA[9:0][ ]) has been updated by the associated pad controller 454 with new data for digital-to-analog conversion. The analog circuit group 104 further receives a sampling signal called "SAMPH[ ]," which is asserted by the associated pad controller 454 to trigger sampling of the analog signal present that is received by the pad 100 for purposes of analog-to-digital conversion.

In general, each pad controller 454, via the associated DAC_DATA[9:0][ ] signal, communicates the DAC data (called "DAC_DATA") from the main controller 450; and the analog circuit groups 104 furnish ADC data (called "ADC_DATA") to the main controller 450. In accordance with some embodiments, the data port register 451 of the main controller 450, via a DMA channel transfer, is written with DAC data, which is communicated to the appropriate pad controller 454 (via the DAC_DATA[ ][9:0]) signal; and the pad controller 454 then communicates the DAC data at the appropriate time to the associated analog circuit group 104. Also, accordance with some embodiments, the data port register 451 provides ADC data, which is then transferred by a DMA channel transfer to the system memory. The timing of when the data is written to and read from the data port register 451 is controlled by the order established by the queue management policy in which pending DMA channel requests are processed. The main controller 450 may further receive signals 453 that are asserted to indicate ADC, DAC and comparator-related triggering events.

Each DMA request circuit 452 receives a conversion done signal (called "CONV_DONE[9:0]"), which indicates when analog-to-digital conversion(s) have been performed by the analog circuit groups 104; and the DMA request block 452 also receives a DAC_UPDATE[9:0] signal, which analog circuit groups 104 need updated data for DAC data. Either event results in a pending DMA channel request, and the DMA request circuit 452 stores pending DMA channel requests for its associated DMA channel in its queue 112. In accordance with some embodiments, the requests may be stored in first in first out (FIFO) ordering scheme, although the DMA request circuit 452 may apply other queue management policies, in accordance with other embodiments.

In accordance with some embodiments, the DMA request circuit 452 asserts a DMA channel request signal called "DMA_SREQ" to request access to the system bus 230 (for a DMA channel transfer. Moreover, the DMA request circuit 452 receives a signal called "DAC_DMA_DONE," which when asserted, indicates that the DMA transfer has been completed. The DMA request circuit 452 further provides a signal called "DMA_DAC_WR[ ]," which is asserted to indicate a particular DMA DAC request. Moreover, each DMA request circuit 452 provides a signal called "DMA_FP_NO," which identifies the DMA channel associated with the currently active DMA channel request for the circuit 452.

Figure 5:
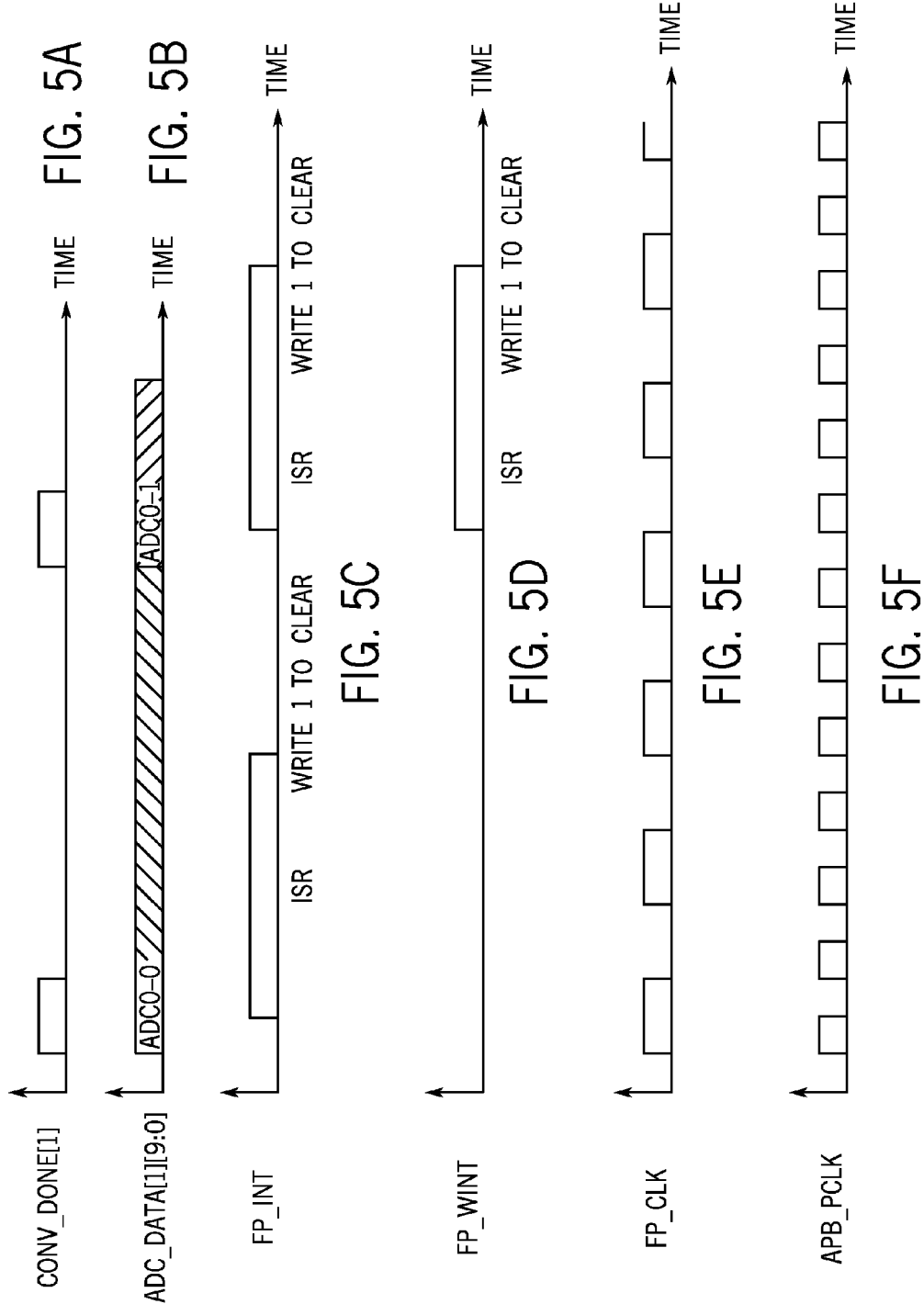
FIGS. 5A, 5B, 5C, 5D, 5E and 5F are waveforms illustrating interrupt management for analog-to-digital converter (ADC) data activity according to an example embodiment.

Referring to FIG. 4 in conjunction with FIGS. 5A, 5B, 5C, 5D, 5E and 5F, the following illustrates ADC interrupt management by the pad interface 110, in accordance with an example embodiment. The operations are clocked by the FP_CLK signal (FIG. 5E), which may be derived from and synchronized to a system bus clock (the APB_PCLK signal of FIG. 5F). Referring to FIG. 5A, in this example, the pad controller 454-1 initially asserts the CONV_DONE[1] signal to indicate that a corresponding ADC conversion has been updated by the associated analog circuit group 104-1. The pad controller 454-1 communicates the ADC data via the ADC_DATA[1][9:0] signal to the main controller 450; and the main controller 450 asserts an interrupt (via the FP_INT signal of FIG. 5C) to indicate to software of the MCU 24 that new ADC data is available. As indicated in FIG. 5C, software may perform a write to the pad interface 110 to clear the interrupt. FIG. 5D illustrates the main controller's assertion of another interrupt signal (FP_WINT of FIG. 5D) to indicate whether the ADC data is inside or outside data. In this manner, in accordance with some embodiments, the ADC data may be routed inside the MCU 24 for use by the processing core 150 or another component of the MCU 24. However, the ADC data may be routed outside of the MCU 24 to another pad 100 (via multiplexing circuitry (not shown) so that an external component of the MCU 24 may use the ADC data.

In accordance with example embodiments, the FP_WINT signal is asserted to indicate that a value indicated by the ADC data for the associated pad 100 has entered or departed from a window of values defined by registers 455 of the pad controller 454. In this regard, in accordance with example embodiments, these registers 455 may be programmed with respective high and low values, defining the boundaries of the window. In accordance with example embodiments, the pad interface 110 may assert an interrupt when given ADC data indicates a signal value that either enters or exits an associated window.

In accordance with further example embodiments, a general interrupt signal may be asserted by a pad interface 110, when ADC data associated with a given pad 100 enters an associated window; and software of the MCU 24 (i.e., the processing core 150 executing machine executable instructions) may read registers of the pad interface 110 for such purposes as identifying the pad associated with the interrupt and determining whether the corresponding value has entered or exited the window. In this manner, in example embodiments, software of the MCU 24 may read status bits, which indicate whether a value associated with the ADC data is greater than a high threshold of the window or lower than a low threshold of the window for purposes of determining if the value is inside or outside of the window. Thus, many embodiments are contemplated, which are within the scope of the appended claims.

The registers 455 of the pad interface 110 may be programmed (via execution of software by the processing core 150, for example) to configure the pad interface 110 to have one of a number of different usage modes. In this manner, a given usage mode defines, among other features, the assignments between the pads 100 and the DMA channels/processing core 150. In accordance with some embodiments, one or more pads 100 may be assigned to the same DMA channel if the pads 100 are associated with ADC or DAC data (i.e., all ADC data or all DAC data) and if the sample rates associated with the pads 100 are related. In accordance with some embodiments, two sample rates are related if one of the sample rates is an integer multiple of the other. Other criteria may be applied to determine whether sample rates are related, in accordance with further embodiments. Two, three or even more pads 100 that have related sample rates may be assigned to the same DMA channel, in accordance with example embodiments.

Moreover, tags are not needed to sort the data, as further described below. In this manner, because of the related sample rates, software (executed by the processing core 150, for example) may sort, or de-interleave, ADC or DAC data associated with multiple pads 100 because the data associated with a given pad has a predictable pattern, or frequency, in the data for the data collection, as further described below. As also described below, for the case of ADC data from multiple pads 100, which is transferred over the same DMA channel and is associated with unrelated sample rates, the pad interface 110 is programmable to pad the ADC data with tags (prefixes, for example) to allow matching of the ADC data with the associated pads 100.

The pad interface 110 may have the following usage modes in accordance with example embodiments: an A1 mode in which a single ADC pad 100 is selected; an A2 mode in which multiple ADC pads 100 with identical sample rates are selected; an A3 mode in which multiple ADC pads 100 with related sample rates are selected; an A4 mode in which multiple ADC pads 100 with unrelated sample rates are selected; a D1 mode in which a single DAC pad 100 is selected; a D2 mode in which multiple DAC pads 100 with identical sample rates are selected; a D3 mode in which multiple DAC pads 100 with related sample rates are selected; and a D4 mode in which multiple DAC pads with unrelated sample rates are selected.

An example pad-to-DMA channel mapping for eight pads 100 (pads 100-1 to 100-8) is set forth below:

TABLE 1

| DMA Channel | Pad 100-1 | Pad 100-2 | Pad 100-3 | Pad 100-4 | Pad 100-5 | Pad 100-6 | Pad 100-7 | Pad 100-8 | Mode | Prefix |
|---|---|---|---|---|---|---|---|---|---|---|
| Ch 0 |  |  |  | 1 |  |  |  |  | DAC |  |
| Ch 1 |  | 1 |  |  |  |  | 1 |  | DAC |  |
| Ch 2 | 1 |  |  |  |  |  |  | 1 | ADC | 1 |
| Ch 4 |  |  | 1 |  |  | 1 |  |  | ADC |  |
|  |  |  |  | PROC CORE |  |  |  |  |  |  |

From the example of Table 1, DMA channel number four is assigned to the two pads 100-3 and 100-6, which are ADC pads and have related sample rates. Pads 100-2 and 100-7 are DAC pads, which are assigned to DMA channel number one and have related sample rates. Pads 100-1 and 100-8 are ADC pads which have unrelated sample rates but are assigned to the same DMA channel number two because prefix padding is enabled to allow software to sort the ADC data according to the pad 100. Pad 100-4 is assigned to the processing core 150. Pads 100-5 and 100-7 are assigned to DMA channel numbers zero and one, respectively.

Figure 6:
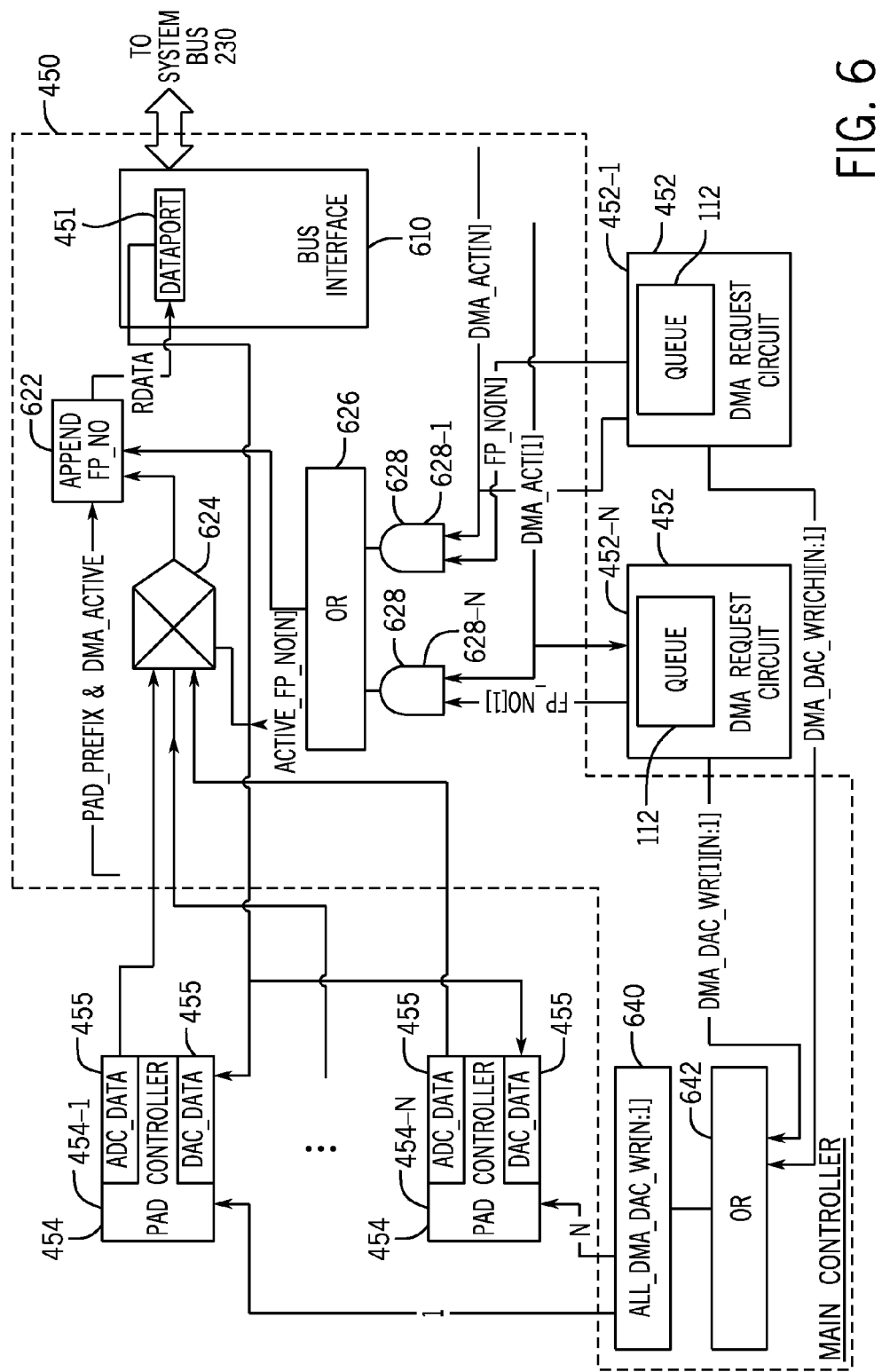
FIG. 6 is a schematic diagram of a controller of the pad interface of FIG. 4 illustrating circuitry of the controller to route data to and from a data port register according to an example embodiment.

FIG. 6 generally depicts the main controller 450 for purposes of illustrating the routing of data to and from the data port register 451 according to an example embodiment. DAC update data is routed from data port register 451 to registers 455 of the pad controllers 454. The registers 455 also provide the ADC data, which is routed to the data port register 451 as follows. A multiplexer 624 receives the ADC data from the pad controllers 454 and selects the appropriate set of ADC data based on an active pad number that is indicated by a selection signal called "ACTIVE_FP_NO[N]". A circuit 622 of the controller 450 pads the prefix of the ADC data with the pad number, in accordance with example embodiments, for purposes of allowing software to sort, or de-interleave, ADC data that was transferred over a common DMA channel but which is associated with unrelated sample rates. Logic (OR gate 626 and AND gates, such as illustrated AND gates 628-1 and 628-N) decode whether the highest ranking request in each queue 112 is a write to or read from system memory. If the active request is a write request, then the ADC data (without or without the prefix) is provided to the data port register 451. As also shown in FIG. 6, if the active request is a read request (i.e., a transfer of DAC data), the controller 450 also includes a set of OR gates 642 and logic 640 to select one of the pad controllers 454 to cause DAC data to be transferred from the data port 451 to the pad controller 454 associated with the active request.

Figure 7:
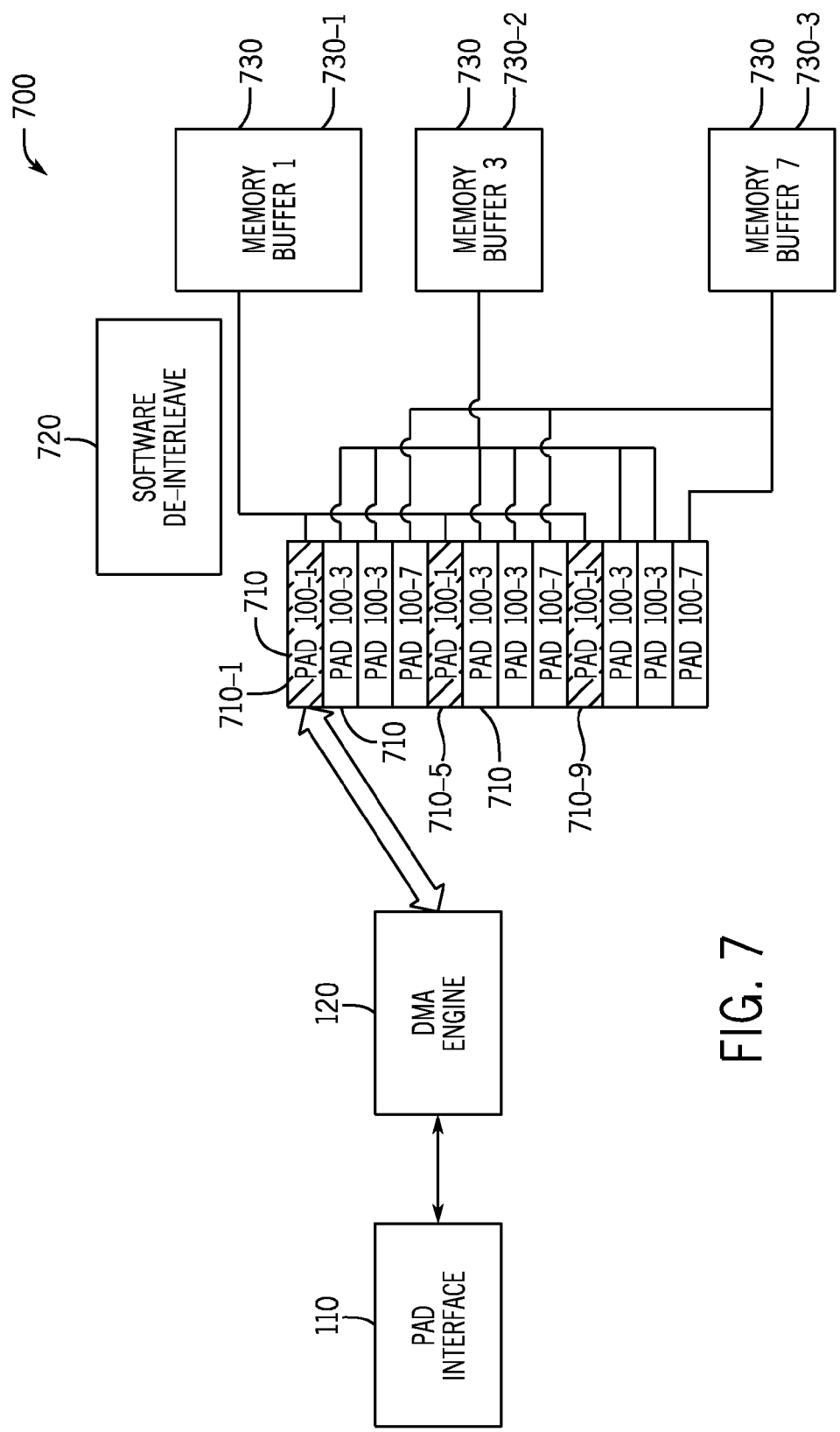
FIG. 7 is an illustration of the processing of ADC or digital-to-analog converter (DAC) data associated with multiple pads, associated with a single DMA channel and having related sample rates according to an example embodiment.

FIG. 7 is an illustration 700 of multiple pads 100 being assigned to the same DMA channel, where the pads 100 have related sample rates and are either associated with DAC or ADC data. For this example, the system memory 250 contains a corresponding memory region of pad data units 710, i.e., data associated with a particular DMA channel. For ADC data, the data units 710 are units of ADC data that is associated with multiple pads 100 and was transferred from the pad interface 100 over the same DMA channel. For DAC data, the data units 710 are units of DAC data to be transferred over the same DMA channel to the pad interface 110. The data units 710 for this example appear in the same order in which the data units 710 are received from/transferred to the pad interface 110. Due to the related sampling rates, data units 710 associated with the same pad appear in a predictable sequence. For example, every fourth data unit 710 (data units 710-1, 710-5 and 710-9 for the example of FIG. 7) contain data associated with the same pad 100-1. Thus, software 720 may de-interleave the data and store the data in memory buffers 730 (memory buffers 730-1, 730-2 and 730-3, being depicted as examples in FIG. 7) associated with the pads 100.

The related sample rates allow software (executed by the processing core 150, for example) to de-interleave the data units 710. For example, for related ADC data units 710, at the end of a DMA cycle for ADC data software 720 may de-interleave the data corresponding to the appropriate pads 110. For DAC data, before the DMA cycle begins, the software creates an interleaved memory buffer for the DMA transfer.

Figure 8:
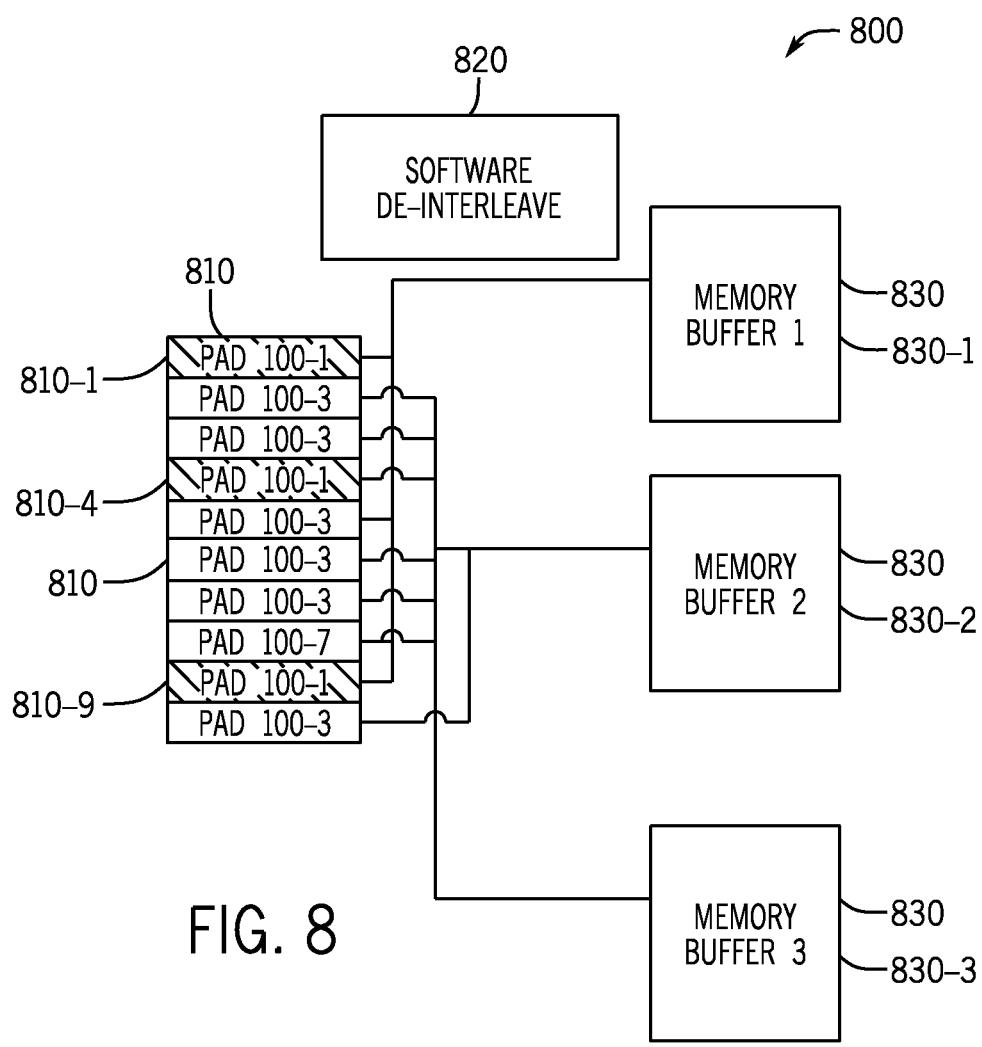
FIG. 8 is an illustration of the processing of ADC data associated with multiple pads, associated with a single DMA channel and having unrelated sample rates according to an example embodiment.

FIG. 8 is an illustration 800 for ADC data, which have unrelated sample rates, i.e., rates such that the data units 810 stored in a DMA channel queue in system memory do not appear in a predictable pattern. For example data units 810-1, 810-4 and 810-9 are associated with the same pad 100 but do not appear in a regular pattern. However, because the pad interface 110 is programmable to add a pad prefix to the ADC data identifying the pads 100, software 820 may still de-interleave the data and store the data in memory buffers 830 (memory buffers 830-1, 830-2 and 830-3, being depicted as examples in FIG. 8) associated with the pads 100. Double buffering may be performed by linking two DMA cycles, where the DMA buffer may be serviced at the end of the first DMA cycle, while the second cycle is active.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. A method comprising:
   programming a direct memory access (DMA) interface of an integrated circuit (IC) to assign a plurality of pads of the IC to a direct memory access (DMA) channel of the IC;
   storing data indicative of DMA requests associated with the pads in a queue of the DMA interface such that at a given time the queue stores data indicative of DMA requests associated with more than one pad of the plurality of pads;
   associating a pad controller of the DMA interface with a given pad of the plurality of pads; and
   using the pad controller to communicate data between the DMA interface and a memory of the IC when a DMA channel is assigned to the given pad.

2. The method of claim 1, wherein using the pad controller to communicate the data comprises performing at least one of writing data for analog conversion to an digital-to-analog converter register associated with the given pad and reading data from an analog-to-digital converter register associated with the given pad.

3. The method of claim 1, wherein the programming comprises assigning the DMA channel to receive either analog-to-digital converted data or provide data for digital-to-analog conversion.

4. The method of claim 1, wherein the pad controller is one of a plurality of pad controllers of the DMA interface and the given pad is one of the plurality of pads, the method further comprising:
   associating a set of circuits with each pad of the plurality of pads, each set comprising an analog-to-digital converter, a digital-to-analog converter and a comparator.

5. The method of claim 1, wherein the given pad is one of a plurality of pads, the method further comprising:
   selectively assigning pads of the IC to have associated memory transfers handled by a processing core of the IC.

6. The method of claim 1, wherein the DMA requests are associated with a related sample rate such that the DMA requests have a predictable ordering within the queue.

7. The method of claim 1, further comprising:
   tagging data associated with the given pad with an identifier for the given pad.

8. An apparatus comprising:
   signal pads;
   a set of analog circuitry associated with each of the signal pads, the set of analog circuitry comprising at least one of an analog-digital converter, a digital-to-analog converter and a comparator;
   a direct memory access (DMA) interface comprising:
   at least one register to assign at least one group of the signal pads to a direct memory access (DMA) channel;
   at least one queue associated with the DMA channel to simultaneously store data indicative of DMA requests associated with more than one pad of the assigned group of pads; and
   pad controllers, wherein each pad controller is associated with a given signal pad of the signal pads and is adapted to communicate data between the DMA interface and a memory when a DMA channel is assigned to the given pad.

9. The apparatus of claim 8, further comprising:
   a processing core;
   wherein the DMA interface comprises a DMA controller to perform memory transfers associated with the DMA requests; and
   wherein at least one register is further adapted to selectively assign the signal pads to have memory transfers handled by the processing core.

10. The apparatus of claim 8, further comprising:
    a processing core;
    wherein the DMA interface comprises a DMA controller to perform memory transfers associated with the DMA requests, and
    wherein the processing core is adapted to process data transfers to the memory by the DMA controller to de-interleave the data according to the pads associated with the data.

11. The apparatus of claim 8, further comprising:
    a processing core; and
    wherein the DMA interface comprises a DMA controller to perform memory transfers associated with the DMA requests, and
    wherein the processing core is adapted to interleave the data according to the pad associated with the data.

12. The apparatus of claim 8, wherein the DMA interface further comprises a circuit to pad data associated with the pads with identifiers identifying a pad number.

13. The apparatus of claim 8, wherein the at least one register assigns the DMA channel to receive either analog-to-digital converted data or provide data for digital-to-analog conversion.

14. An apparatus comprising:
    an integrated circuit (IC) comprising a plurality of pads and a direct memory access (DMA) interface,
    wherein the DMA interface is adapted to store data indicative of DMA requests associated with the pads in a queue of the DMA interface such that a given time the queue stores data indicative of DMA requests associated with more than one pad of the plurality of pads, the DMA interface is adapted to be programmed to assign a given pad of the plurality of pads to a DMA channel of the IC, and the DMA interface comprises:
    a pad controller associated with the given pad and adapted to communicate data between the DMA interface and a memory of the IC via DMA transfers when a DMA channel is assigned to the given pad.

15. The apparatus of claim 14, wherein the DMA interface comprises a multiplexing circuit to multiplex data associated with the DMA requests with a DMA register of the interface.

16. The apparatus of claim 14, wherein the pad controller comprises at least one register, and the pad controller is further adapted to communicate data between the at least one register and the memory via central processing unit (CPU)-controlled transfers when no DMA channel is assigned to the given pad.

17. The apparatus of claim 14, further comprising:
a processing core; and
a DMA controller to perform memory transfers associated with the DMA requests,
  wherein the processing core is adapted to process data transfers to the memory by the DMA controller to de-interleave the data according to the pads associated with the data.

18. An apparatus comprising:
an integrated circuit (IC) comprising a plurality of pads and a direct memory access (DMA) interface,
wherein the DMA interface is adapted to store data indicative of DMA requests associated with the pads in a queue of the DMA interface such that a given time the queue stores data indicative of DMA request associated with more than one pad of the plurality of pads, the IC comprises a central processing unit (CPU) and the DMA interface comprises:
a pad controller associated with a given pad of the plurality of pads and adapted to alert the CPU in response to a signal received by the given pad entering or exiting a predefined window of values.

\* \* \* \* \*